United States Patent [19]

Neil et al.

[11] Patent Number: 5,083,871
[45] Date of Patent: Jan. 28, 1992

[54] METHOD AND APPARATUS FOR MIXING CERAMIC POWDER AND BINDER FOR INJECTION MOLDING

[75] Inventors: Jeffrey T. Neil, Acton; Anthony P. Moschetti, Jr., Fitchburg, both of Mass.

[73] Assignee: GTE Laboratories Incorporated, Waltham, Mass.

[21] Appl. No.: 633,642

[22] Filed: Dec. 21, 1990

[51] Int. Cl.⁵ .............................................. B29B 1/04
[52] U.S. Cl. ..................................... 366/69; 366/144
[58] Field of Search ....................... 366/69, 92, 93, 94, 366/95, 129, 130, 144, 219, 220, 224, 348, 349, 602

[56] References Cited

U.S. PATENT DOCUMENTS 3,030,081  4/1962  Wilson ................................ 366/348
3,221,944  12/1965  Brennon .............................. 366/130
3,771,773  11/1973  Schriever ............................ 366/69

Primary Examiner—Robert W. Jenkins
Attorney, Agent, or Firm—Carl F. Ruoff

[57] ABSTRACT

A method and apparatus for mixing ceramic powder and binder to form an injection molding formulation is disclosed. A container made of wear resistant plastic such as polytetrafluoroethylene, nylon or polyetheretherketone having an inner surface which forms a mixing cavity is used. A mixing ball having a radius of curvature less than the radius of curvature of the inner surface is added to the mixing cavity along with the ceramic powder and binder. The container is heated and shaken to form an injection molding formulation. In one embodiment the mixing ball is made of an outer plastic shell surrounding an inner metallic core. In an alternate embodiment, the mixing ball is made of the ceramic material being compounded.

10 Claims, 3 Drawing Sheets

METHOD AND APPARATUS FOR MIXING CERAMIC POWDER AND BINDER FOR INJECTION MOLDING

BACKGROUND OF THE INVENTION

The present invention describes a method and apparatus for mixing ceramic powder and binder for injection molding. More particularly, the present invention discloses a method of mixing ceramic powder and binder in which metallic contamination from the mixer is eliminated.

The mixing of ceramic powder and binder for ceramic injection molding represents a critical step in the fabrication process for injection molded parts. The mixing equipment used for this process is, however, almost exclusively metallic. This combined with the long duration of batch compounding cycles (typically 1 to 4 hours) leads to significant metallic contamination of the ceramic mix. Study of fractured ceramic components often identifies such particulate contamination i.e. high density inclusions (HDIs) as the source of failure.

An additional drawback of batch type compounding is the need to largely fill the mixing cavity for best mixer performance. There is therefore no way to produce a high quality mix using only very small batches of ceramic powder (for QC or experimental purposes).

The present invention avoids these constraints while eliminating contamination from metallic parts.

SUMMARY OF THE INVENTION

The apparatus developed for mixing ceramic powder and a binder is a container made of wear resistant plastic (Teflon®, Nylon, or PEEK), using a dense ceramic ball or a plastic covered metallic ball. The ball along with the ceramic powder and binder is heated in the container and the container is shaken on a wrist action shaker. The mixing ball is made of the ceramic powder being mixed or of an abrasionresistant plastic sheath surrounding a metal core. The action disperses the ceramic in the binder in a time substantially less than that required for conventional compounding equipment. Metallic contamination from the mixer is also eliminated. The system can be used to mix quantities as small as 10 grams and can be scaled to larger sizes.

For a better understanding of the present invention together with other objects, advantages and capabilities thereof reference is made to the following description and appended claims in connection with the above described drawing.

DETAILED DESCRIPTION OF PREFERRED EMBODIMENT

In order to eliminate metallic contamination of ceramic parts, a mixing method and apparatus were developed. The apparatus includes a plastic mixing container and a mixing ball. The mixing ball is made of the ceramic material to be mixed or of an abrasion-resistant outer sheath covering an inner metal core.

The present invention utilizes a wrist action shaker to perform the mixing operation. Such shakers are widely used to prepare powder or slurry mixes in small scale, and for re-mixing paints in larger scale systems.

The present invention uses a mixer constructed of plastic which is both suitable for use at elevated temperatures (70–100° C.) and is wear resistant. This container in conjunction with a ceramic or plastic encased metal mixing ball eliminates metallic contamination sources. The container has a corner radius larger than the mixing ball radius, to eliminate "dead" mixing zones in corners. A single mixing ball was employed so that all mixing is due to shear between the ball and container wall.

Figure 1:
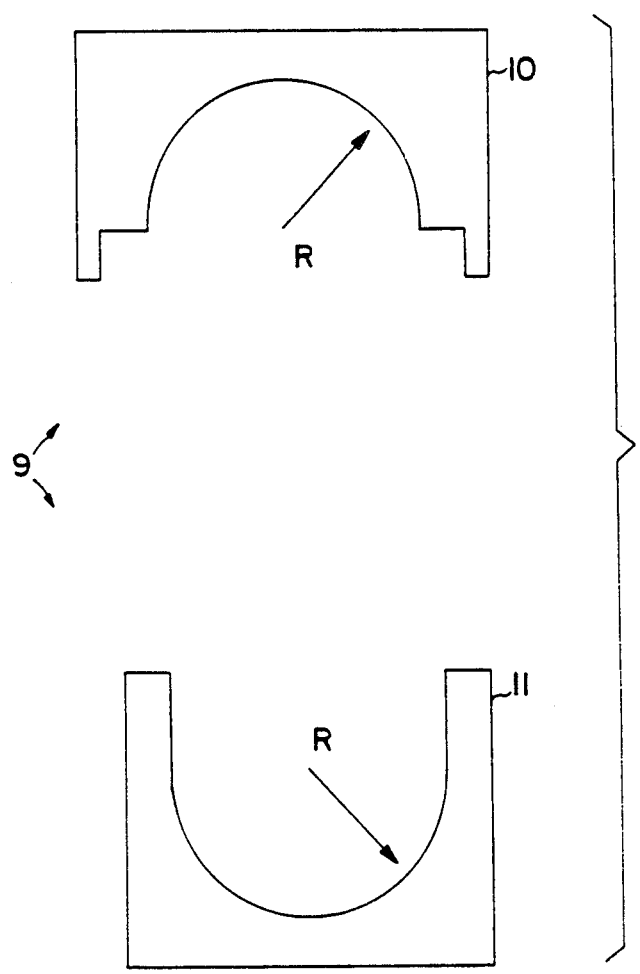
FIG. 1 shows a cross-sectional view of the mixing container of the present invention.

FIG. 1 shows the plastic mixing container 9 used in the present invention. The mixing container is made up of a mixer cover 10 and a mixer body 11. The container was constructed of polytetrafluoroethylene (PTFE) also known as Teflon® although other abrasion-resistant plastics such as nylon or polyetheretherketone (PEEK) can be used. The mixer cover and body are attached by screw threads (not shown) although other suitable attachment means are available. The mixer cover and body have a radius of curvature R which is greater than the radius of the mixing ball to ensure that no dead spots occur.

Figure 2:
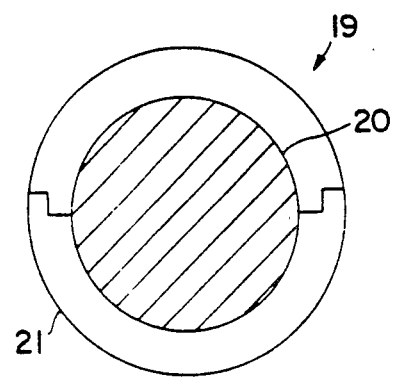
FIG. 2 shows a cross-sectional view of the mixing ball used in the present invention.

There were two types of mixing balls used in Examples that follow. The first type is a ceramic mixing ball of silicon nitride which is the ceramic material being compounded. The second type of mixing ball 19 is shown in FIG. 2 wherein a solid ball core 20 is surrounded by a nylon shell 21. The nylon shell 21 consists of two halves which are screwed together by threaded joints (not shown). The nylon shell can also be joined using a silicon adhesive. This eliminates the threaded joint. The solid core 20 is a higher density material such as stainless steel or tungsten carbide.

Figure 3:
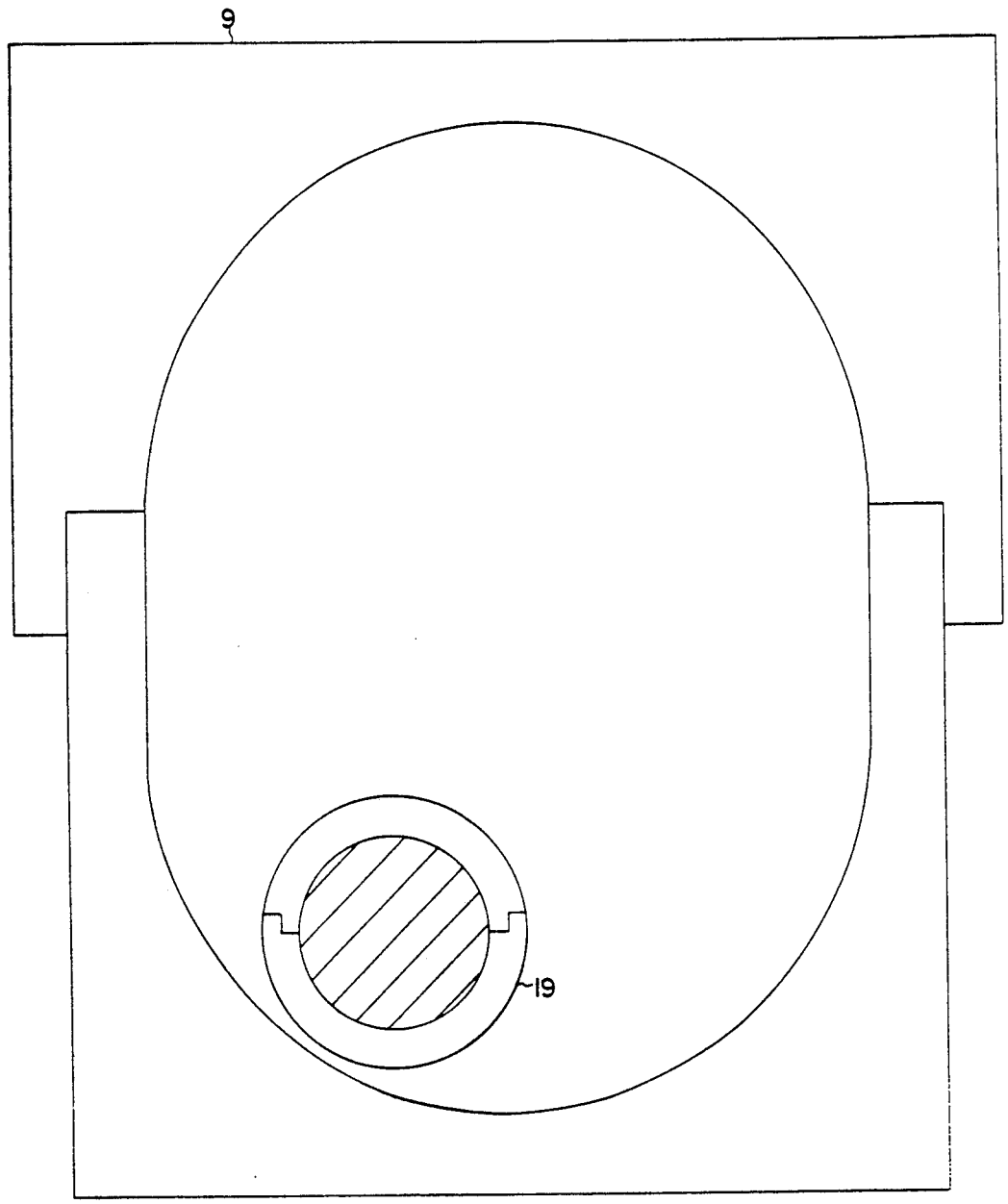
FIG. 3 shows the cross-sectional view of the mixing container and mixing ball.

FIG. 3 shows a cross-sectional view of the nylon enclosed mixing ball 19 within the mixing container 9.

EXAMPLE 1

A mixing container of the design shown in FIG. 1 was constructed of Teflon®. The radius of curvature of the inner cavity was ⅞ of an inch. This was used in conjunction with a single ¾ inch diameter (⅜ inch radius) mixing ball of sintered silicon nitride.

The powder used for the compounding was a premilled mixture of 94 w/o $Si_3N_4$ (Ube ESP grade) and 6 w/o $Y_2O_3$ (Molycorp). A binder of 90% 1865Q-wax (Astor Chemicals Ltd.), 5% Epoxy resin/hardener (Acme 5144), and 5% stearic acid (Fisher Scientific) was premelted, cooled and granulated.

Ten grams of ceramic powder, and 2 grams of binder were placed in the container followed by the ceramic mixing ball. The closed container was placed in an oven set at 70° C. for 30 minutes. The container was then placed while warm in a wrist action shaker (Spex Industries) and mixed for five minutes. The container was opened, the contents broken up, and the container reassembled. The container was again heated to 70° C., followed by another 5 minutes of mixing.

The compounded mix was removed from the container, and granulated by hand.

Viscosity of the mix was measured using a Galaxy 1 Melt Flow Indexer. The viscosity of the mix (calculated to be 58 volume percent ceramic) was too low to be measured by the unit (less than 300 poise).

EXAMPLE 2

Using the container, powder, and binder of Example 1, 13.06 grams of ceramic powder, and 2.6 grams of binder were placed in the container followed by the ceramic mixing ball. The container was then placed while warm in a wrist action shaker and mixed for five minutes.

The compounded mix was removed from the container, and granulated by hand.

Viscosity of the mix was measured using a Galaxy 1 Melt Flow Indexer. The viscosity of the mix (calculated to be 63 volume percent ceramic) was 456 poise. This value is slightly more fluid than similar mixes prepared in batch type sigma blade mixers, which give viscosity values of 700 to 900 poise.

Values of viscosity of under 6,000 poise are considered suitable for injection molding complex ceramic shapes.

EXAMPLE 3

The powder used for the compounding was a premilled mixture of 92 w/o $Si_3N_4$ (Denka SN-9FW grade), 6 w/o $Y_2O_3$ (Molycorp), and 2 $Al_2O_3$ (Baikowski CR-30). A binder of 90% 1865Q-wax (Astor Chemicals), 5% Epoxy resin/hardener (Acme 5144), and 5% stearic acid (Fisher Scientific) was premelted, cooled and granulated.

13.06 grams of ceramic powder, and 2.6 grams of binder were placed in the container used in Example 1 followed by the silicon nitride ceramic mixing ball. The closed container was placed in an oven set at 80° C. for 30 minutes. The container was then placed while warm in a wrist action shaker and mixed for five minutes. The container was opened, the contents broken up, and the container reassembled. The container was again heated to 80° C. for 30 minutes, followed by another 5 minutes of mixing. The contents were removed, broken up, and the mixer reassembled. A third heating to 80° C. was made for 30 minutes, followed by another 5 minutes of wrist action mixing.

The compounded mix was removed from the container, and granulated by hand.

Viscosity of the mix was measured using a Galaxy 1 Melt Flow Indexer. The viscosity of the mix (calculated to be 63 volume percent ceramic) was 631 poise.

Since the results of these examples demonstrate the feasibility compounding an injection molding mixture of ceramic powder and binder, a larger mixing container was prepared which was capable of compounding mixtures of 600 gm of ceramic powder.

EXAMPLE 4

The mixing container was constructed of Nylon with an oval internal configuration. The radius of curvature at the ends was approximately 2⅛ inches. The system utilizes a 3-way orbital mixing action (Red Devil Inc. Mixer Model 5410) and a single mixing ball. Two mixing balls were prepared and are listed below;
1. Isopressed and HIPed PY6 (94% silicon nitride, 6% yttria) (density=3.3 gm/cc)
2. Nylon capped WC (tungsten carbide) ball (composite density=6 gm/cc) (see FIG. 2)

The mixing balls had an outer diameter of approximately 1¾ inches.

To perform the compounding, the powder, binder and mixing ball were loaded into the Nylon mixing container and preheated to the compounding temperature. The sealed mixing container was then loaded into the orbital mixer and compounded for the desired period (typically 10 minutes). The compounded mix was removed, cooled and granulated.

Since no metallic component contacts the silicon nitride mix during compounding with this approach, such contamination can be eliminated. This was confirmed by warm pressing compounded mix from the plastic mixer into two inch diameter disks in a tungsten carbide lined die and examining the disks using microfocus X-radiography.

The quality of compounded mix prepared by this technique was evaluated further by melt index viscosity measurements for four processing conditions:
A. PY6 mixing ball (ball 1) and warm mixer (95° C)
B. PY6 mixing ball (ball 1) and warm mixer (95° C), then twin screw compounding (Betol Machinery Limited Model BTS-40)
C. L.C. Nylon capped WC ball (ball 2) and warm mixer (95° C)
D. Nylon capped WC ball (ball 2) and cooler mixer (50° C.)

Figure 4:
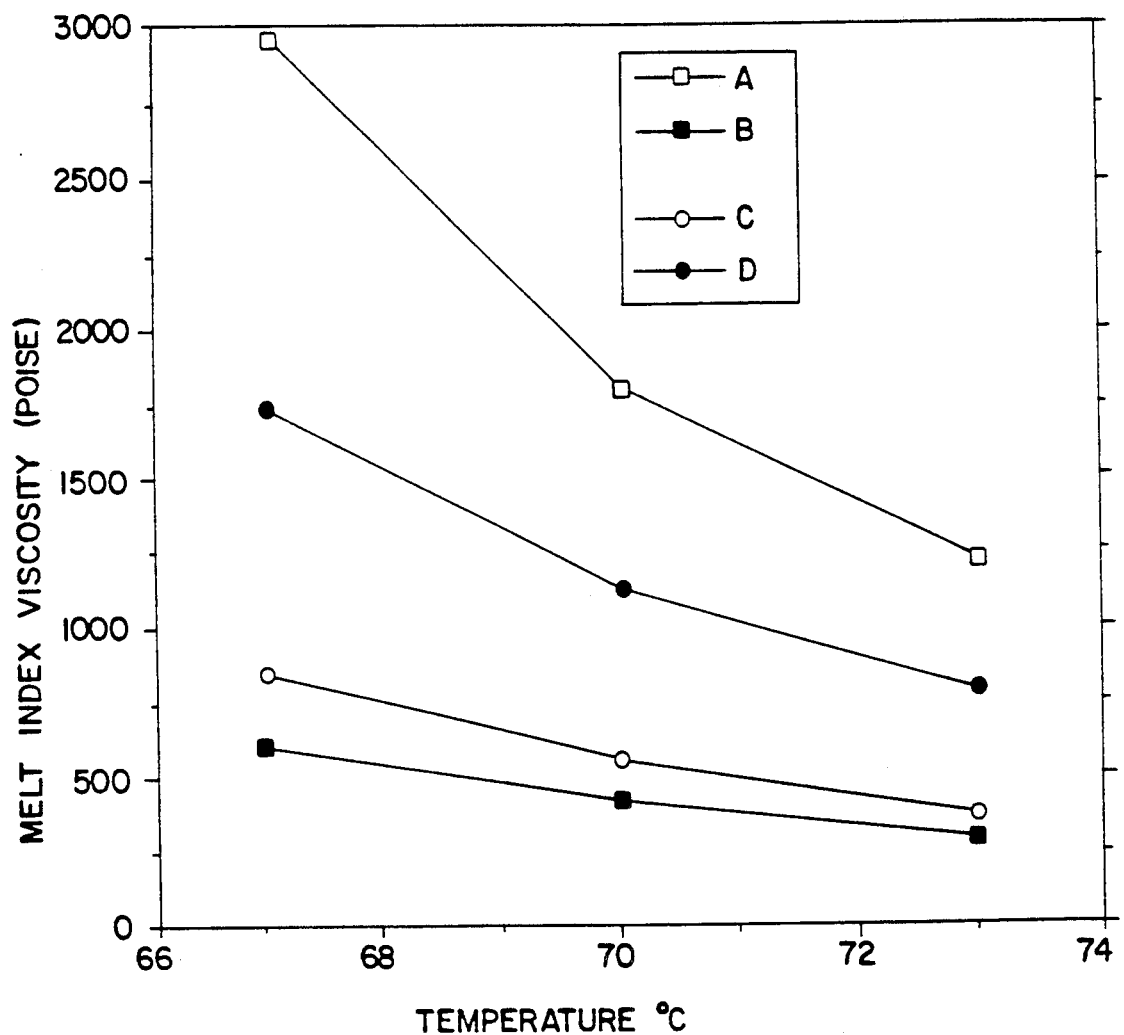
FIG. 4 shows the melt index viscosity of injection molding formulations compounded using the apparatus of the present invention.

The resulting viscosity curves are shown in FIG. 4. The material mixed with the lower density PY6 ball possesses a high viscosity but it is still within the range suitable for injection molding, i.e. less than 6000 poise.

Use of a twin screw compounder after this mixing results in a substantial decrease in viscosity. It is also apparent that the use of a higher density mixing ball (ball 2) showed a major improvement in compounding, and that a higher temperature preheat is desirable for best mixing quality.

The conditions of a high density mixing ball along with a warmer mixer result in a comparable mix viscosity to that processed through the high shear twin screw compounder.

Based on these experimental findings, the plastic mixer was utilized to produce sufficient compounded mix for tensile bar injection molding trials. Half of the prepared mix was used direct from the plastic compounder, the remaining material was passed through the twin screw compounder prior to granulation.

Nondestructive evaluation was used to compare the metallic contamination levels of the compounding process routings. The orbital mixer using the mixing container and mixing ball of the present invention was investigated, utilizing a nylon mixing chamber and a single non-metallic ball. Some material from the non-metallic mixer was passed through a high-shear Betol twin screw compounder which has tool steel components. This was compared to material compounded in a conventional Batch Type Sigma blade mixer. (Paul O. Abbe Inc. Model 1 AMP) A group of 6 warm-pressed specimens from each compounded batch was inspected with microfocus x-ray imaging. Imaging was done at 10X magnification on a high contrast film. A summary of the number of detected high density inclusions (HDIs) is given in Table 1.

TABLE 1

| Comparison of metallic contamination. Number of HDIs/cm$^3$ | | | | |
|---|---|---|---|---|
| | Mean | Std. | Max. | Min. |
| Orbital Mixer | 0.00 | 0.00 | 0.00 | 0.00 |
| Orbital Mixer | 0.98 | 0.52 | 1.72 | 0.49 |

TABLE 1-continued

| Comparison of metallic contamination. Number of HDIs/cm³ | | | | |
| --- | --- | --- | --- | --- |
| | Mean | Std. | Max. | Min. |
| with Twin Screw Large ABBE | 2.93 | 0.96 | 4.69 | 1.97 |

The HDI count was normalized to 1 cubic centimeter. The severity of metallic contamination contributed by compounding is apparent when the data are presented in this way. It has been observed that the majority of tensile specimens fail at HDIs. The HDIs detected by this analysis were larger than 50 micrometers in size and would be critical defects. No high density inclusions were detected in the material from the non-metallic orbital compounder.

Thus, the present invention completely eliminates metal contamination from the compounding process for ceramic injection molding.

While there has been shown what are at present considered the preferred embodiments of the invention, it will be obvious to those skilled in the art that various alterations and modifications may be made therein without departing from the scope of the invention.

What is claimed is:

1. A mixing apparatus for compounding ceramic injection molding formulations comprising:
   a mixing container having an inner surface which forms a cavity, the inner surface having a first radius of curvature, said mixing container being formed of an abrasionresistant plastic; and
   a mixing ball having an outer surface having a second radius of curvature, the second radius of curvature being less than the first radius of curvature;
   wherein said mixing ball and a ceramic injection molding formulation is placed within the cavity and the mixing container is shaken to compound the ceramic injection molding formulation.

2. The apparatus according to claim 1 wherein said mixing container and mixing ball can be heated to approximately 100° C.

3. The apparatus according to claim 1 wherein said mixing ball is made of a ceramic material.

4. The apparatus according to claim 3 wherein the ceramic material is silicon nitride.

5. The apparatus according to claim 1 wherein said abrasion-resistant plastic is selected from the group consisting of polytetrafluoroethylene, nylon and polyetheretherketone.

6. The apparatus according to claim 1 wherein said mixing ball further comprises:
   an outer abrasion-resistant plastic shell; and
   an inner metallic core.

7. The apparatus according to claim 6 wherein said abrasion-resistant plastic shell is selected from the group consisting of polytetrafluoroethylene, nylon and polyetheretherketone.

8. The apparatus according to claim 6 wherein said inner metallic core is selected from the group consisting of steel and tungsten carbide.

9. A method of mixing a ceramic powder and a binder to from an injection molding formulation comprising:
   providing a mixing container having an inner surface which forms a cavity, the inner surface having a first radius of curvature, said mixing container being formed of nonabradable plastic; and
   providing a mixing ball having an outer surface having a second radius of curvature, the second radius of curvature being less than the first radius of curvature;
   adding a ceramic powder and a binder and the mixing ball to the cavity of the mixing container;
   heating the mixing container to between about 70° C. and 100° C.;
   agitating said container for a period sufficient to form a homogeneous injection molding formulation wherein said homogeneous injection molding formulation is free of metallic contamination.

10. A method of mixing a ceramic powder and a binder to from an injection molding formulation:
   providing a mixing container having an inner surface which forms a cavity, the inner surface having a first radius of curvature, said mixing container being formed of abrasion-resistant plastic; and
   providing a mixing ball having an outer surface having a second radius of curvature, the second radius of curvature being less than the first radius of curvature;
   adding a ceramic powder and a binder and the mixing ball to the cavity of the mixing container; and
   agitating said container for a period sufficient to form a homogeneous injection molding formulation wherein said homogeneous injection molding formulation is free of metallic contamination.

* * * * *